(12) United States Patent
Gombert

(10) Patent No.: US 9,076,110 B2
(45) Date of Patent: Jul. 7, 2015

(54) PRINT-SHOP JOB PRICE OPTIMIZATION VIA THE USE OF PLANNING, SCHEDULING AND SIMULATION

(75) Inventor: Barry Glynn Gombert, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2344 days.

(21) Appl. No.: 11/835,107

(22) Filed: Aug. 7, 2007

(65) Prior Publication Data

US 2009/0043628 A1 Feb. 12, 2009

(51) Int. Cl.
*G06F 17/00* (2006.01)
*G06Q 10/06* (2012.01)
*G06F 3/12* (2006.01)

(52) U.S. Cl.
CPC .......... *G06Q 10/06* (2013.01); *G06Q 10/06312* (2013.01); *G06Q 10/06375* (2013.01); *G06F 3/1275* (2013.01); *G06F 3/1217* (2013.01); *G06F 3/126* (2013.01); *G06F 3/1285* (2013.01)

(58) Field of Classification Search
CPC .......... G07B 17/00467; G06F 21/608; G06Q 30/0283; G06Q 10/10
USPC ................ 705/400, 406, 408, 7.11; 358/1.15; 700/99
See application file for complete search history.

(56) References Cited

U.S. PATENT DOCUMENTS

| | | | |
|---|---|---|---|
| 5,826,244 A | 10/1998 | Huberman | |
| 6,246,993 B1 * | 6/2001 | Dreyer et al. | 705/7.26 |
| 7,359,076 B2 * | 4/2008 | Uchino | 358/1.15 |
| 7,630,669 B2 * | 12/2009 | Banton | 399/222 |
| 2002/0165833 A1 * | 11/2002 | Minowa et al. | 705/400 |
| 2007/0091355 A1 | 4/2007 | Rai | |
| 2007/0177191 A1 | 8/2007 | Eschbach et al. | |
| 2007/0183811 A1 * | 8/2007 | Banton | 399/222 |
| 2007/0245358 A1 * | 10/2007 | Hattori et al. | 719/321 |
| 2008/0117463 A1 * | 5/2008 | Ohkubo et al. | 358/1.18 |
| 2008/0175641 A1 * | 7/2008 | Harris et al. | 400/62 |
| 2008/0235158 A1 * | 9/2008 | Manchala et al. | 705/400 |

(Continued)

FOREIGN PATENT DOCUMENTS

| | | |
|---|---|---|
| GB | 2387004 A | 10/2003 |
| JP | 2002355954 A | 12/2002 |

(Continued)

OTHER PUBLICATIONS

Bronstein, Sylvia; "Internet treasure: Looking for Cheap Color Printing? The Answer is Easy. Online Printing Services Can Save You Money on Your Advertising, Sales and Marketing Literature", May 17, 2009, singletreasure.blogspot.com; 2 pages.*

*Primary Examiner* — Shannon S. Campbell
*Assistant Examiner* — Freda A Nelson
(74) *Attorney, Agent, or Firm* — Fox Rothschild LLP

(57) ABSTRACT

Methods and systems for improving resource usage in a print shop are disclosed A system may include a workflow management system and a plurality of resource in the print shop. The workflow management system may be configured to receive a plurality of print jobs for processing at the print shop and determine a cost per item for processing the plurality of print jobs based on economic data associated with the print jobs. The workflow management system may determine whether the cost per item will be reduced by adding, removing or modifying a print job. An added print job may be of a different type than the plurality of print jobs. The plurality of resources may be capable of processing the plurality of print jobs.

21 Claims, 4 Drawing Sheets

(56) References Cited

U.S. PATENT DOCUMENTS

2009/0204496 A1* 8/2009 Otto et al. .................. 705/14
2010/0057661 A1* 3/2010 Otto et al. .................. 706/47

FOREIGN PATENT DOCUMENTS

| | | |
|---|---|---|
| JP | 2005007601 A | 1/2005 |
| JP | 2007018148 A | 1/2007 |

* cited by examiner

PRINT-SHOP JOB PRICE OPTIMIZATION VIA THE USE OF PLANNING, SCHEDULING AND SIMULATION

CROSS-REFERENCE TO RELATED APPLICATIONS

This application is related to U.S. patent application Ser. No. 11/343,332 to Eschback et al., filed Jan. 31, 2006, which is incorporated herein by reference in its entirety.

Not Applicable

BACKGROUND

1. Technical Field

The present disclosure generally relates to methods and systems for processing print jobs is a print shop. More specifically, the present disclosure relates to methods and systems for increasing the efficiency of processing print jobs by soliciting and processing numerous print jobs that utilize resources available in a print shop in a cost-effective manner.

2. Background

A print shop is typically a high-volume document production entity that produces documents, such as checks, invoices, statements, books, magazines and the like, received from businesses and/or individuals. In some cases, the data printed on each document (or set of documents) varies significantly. For example, the data on a first document might pertain to a first credit card user for a credit institution, while the data on a second document might pertain to a second credit card user for the credit institution. However, in other cases, such as book printing, several identical documents might be produced and finished consecutively.

A conventional print shop workflow is depicted in FIG. 1. As shown in FIG. 1, incoming data pertaining to a print job is processed 105 to determine the operations to be performed. The data is then printed 110 using, for example, a continuous feed printer. A continuous feed printer may include a roll of paper including pre-printed forms. As such, paper is continuously fed into the printer resulting in high speed printing. Data can then be printed on the forms corresponding to a plurality of recipients. Other printers, such as cut sheet printers, can also be used in a print shop.

One or more of folding 115, inserting 120 and sorting 125 operations can be performed based on the requirements of the print job. For a folding operation 115, each printed form can be folded according to the print job requirements. Ancillary documents can be inserted 120 into the print job. For example, an advertisement for a service provided by a bank might be inserted into a bank statement print job. A sorting operation 125 could be used to sort the documents into individual document groups for each recipient. Each document group can then be mailed 130 to the appropriate recipient.

Typically a user submits a print job for processing and agrees to pay a quoted price for processing the print job. The price is based on a fixed pricing model such as a fixed price per sheet or a fixed price per impression. The price for a particular print job could then be adjusted based on additional operations to be performed, such as folding, inserting, shrink wrapping and the like.

Improvements to this method have been proposed. For example. U.S. patent application Ser. No. 11/343,332 to Eschback et al. describes a method and system for linking a print shop to an online offer generation module and associated pricing module. The described method includes a dynamic pricing model in which the price for processing a print job is established during the ordering process.

In addition, automated price negotiations for document services have been developed. For example, U.S. Pat. No. 5,826,244 to Huberman discloses an automated brokered auctioning system for document services that enables customers and suppliers to submit bids for a document service. The automated process then determines whether a price can be established that is satisfactory to both a customer and a supplier. If the price can be established, a transaction is proposed to the customer and the supplier at the established price.

The above-described print job processing algorithms provide adequate pricing and price negotiation models for print jobs received by print shops. However, such algorithms do not account for or seek to improve the efficiency of the print shop. As such, the print shop could have a number of resources that are idle while other resources are highly utilized. For example, if the print shop processes print jobs that require shrink wrapping but no insertions, the insertion devices for the print shop may sit idle. Alternatively, if the print shop is only processing a number of book orders, continuous feed printers might be idle, while cut sheet printers might be highly utilized.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "print job" is a reference to one or more print jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system for increasing efficiency in a print shop may include a workflow management system and a plurality of resources in the print shop. The workflow management system may be configured to receive a plurality of first type print jobs for processing at a print shop, determine a cost per item for processing the plurality of first type print jobs based on economic data associated with the plurality of first type print jobs, and determine whether the cost per item will be reduced by performing one or more of adding a second type print job, removing a first type print job, and modifying a first type print job. The plurality of resources may be capable of processing the first type print jobs.

In an embodiment, a computer-implemented method of increasing efficiency in a print shop may include receiving, at a workflow management system, a plurality of first type print job for processing at a print shop, determining, via the workflow management system, a cost per item for processing the first type print jobs based on economic data associated with the first type print jobs, determining whether the cost per item will be reduced by performing one or more of adding a second type print job, removing a first type print job, and modifying a first type print job, and processing the first type print jobs to produce one or more documents.

DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "print shop" refers to an entity that includes a plurality of resources for producing documents, such as printers, cutters, collators, inserters, shrink wrapping devices and the like. The print shop may be a freestanding entity, including one or more print-related devices, or it may be part of a corporation or other entity. Additionally, the print shop may communicate with one or more servers by way of a local area network (LAN) or a wide area network (WAN), such as the Internet, the World Wide Web or the like.

The term "device" refers to a machine used to perform an operation. Exemplary devices in a print shop include printers cutters, collators, inserters, shrink wrapping devices and the like.

A "resource" refers to an element of a print shop that performs a function. A resource can be a device or manpower. For example, in a print shop, a human operator may be required to transport an intermediate work product, such as a printed document, between or among devices as part of a job.

A "job" refers to a logical unit of work that is to be completed for a customer. For example, a job may include one or more instructions and one or more parameters that, when processed, result in an output. In a print shop, a job may include one or more print jobs from one or more customers. A production system may process a plurality of jobs.

A "print job" refers to a job that is processed in a print shop. For example, a print job may include one or more instructions and one or more parameters that, when processed, result in printed documents, such as credit card statements corresponding to a certain credit card company, bank statements corresponding to a certain bank, books, magazines or the like.

"Economic data" refers to information pertaining to the cost of producing an item and/or performing an operation when processing a print job. The economic data may be based on the cost of operating one or more resources used to process a print job, material costs, labor costs, and the like.

Figure 1:
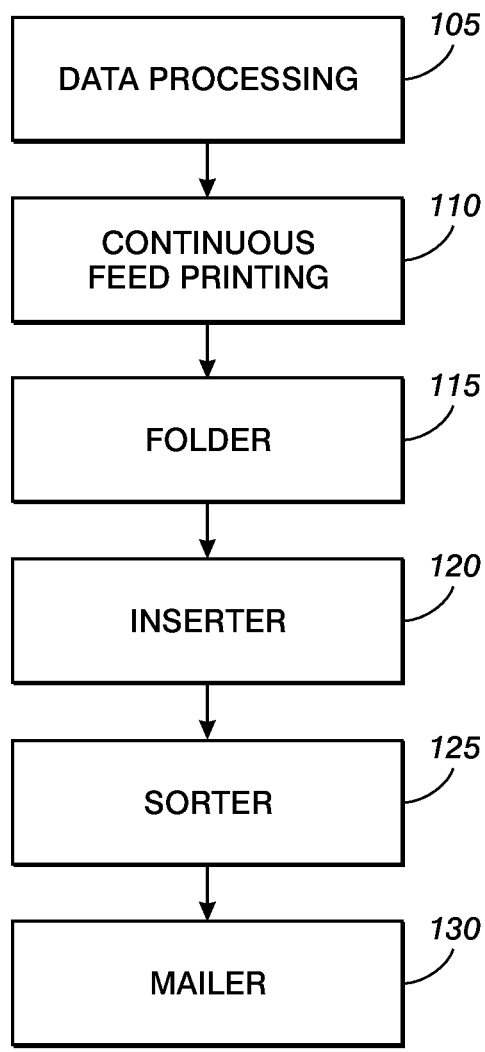
FIG. 1 depicts a conventional print shop workflow.
Figure 2:
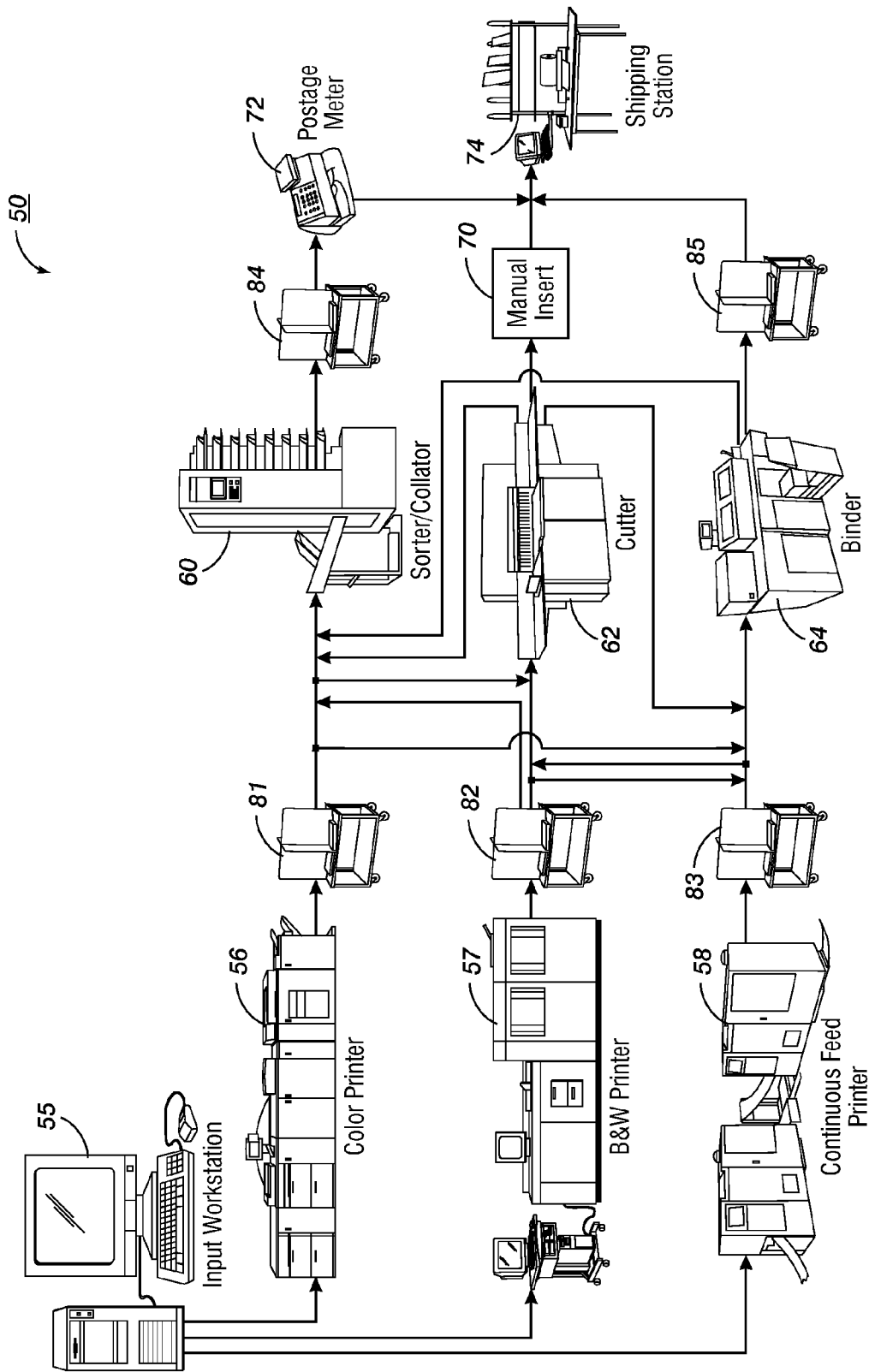
FIG. 2 depicts exemplary elements of a print shop according to an embodiment.

FIG. 2 shows an example of a print shop 50. Print jobs may enter the print shop manually or electronically and be collected at an electronic submission system 55, such as a computing device and/or scanner. Print jobs are sorted and batched at the submission system or another location, such as a workflow management system, before being delivered to one or more print engines, such as a color printer 56, black-and-white printer 57 and/or a continuous feed printer 58. Printed documents may exit the print engine and be delivered to one or more finishing devices or areas such as a collator 60, cutter 62 and/or binder 64. The finishing areas may include automatic or manual areas for such finishing activities, and they also may include an automatic or manual inserter 70. Finally, the documents may move to a postage metering station 72 and/or shipping station 74. Documents for print jobs may move from one location to another in the print shop by automatic delivery or manual delivery, such as by hand or by one or more paper carts 81-85.

Different elements of a print shop 50 may require setup time in order to prepare the device to process a particular print job. For example, some print jobs use pre-printed forms, such as bank statements that are pre-printed with the bank's logo and contact information or credit card statements pre-printed with charge dispute procedures. Forms also may include inserts, such as marketing materials or subscription cards. If a device in a print shop receives two consecutive print jobs that use identical forms, little or no changeover is required between the two print jobs. However, if the forms are different, the print jobs have different setup characteristics, and a significant setup time may be required to load the new form into the device. This is especially noticeable in continuous feed printing devices 58, where it can take up to 15 minutes or more to load a new form roll.

Figure 3:
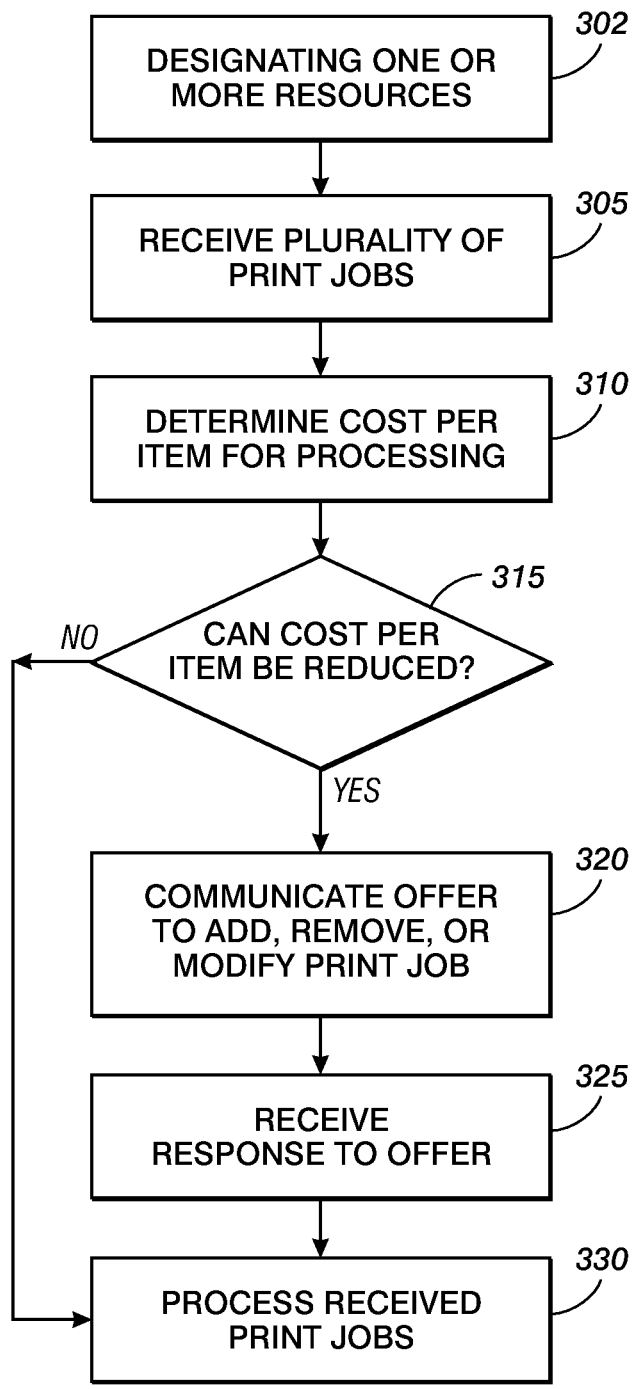
FIG. 3 depicts a flow diagram of an exemplary method of increasing the efficiency of a print shop according to an embodiment.

FIG. 3 depicts a flow diagram of an exemplary method of increasing the efficiency of a print shop according to an embodiment. Efficiency of the print shop may be improved by soliciting one or more print jobs having one or more print job types from customers of the print shop. For example, by soliciting print jobs having print job types that increase the utilization of resources in a print shop, the print shop may increase its efficiency.

In an embodiment, one or more resources may initially be designated 302 to perform at least one print job. A print shop may receive 305 a set of print jobs for processing. The print jobs may be received 305, for example, at a workflow management system. The workflow management system is a system that determines the manner in which a set of print jobs are processed in a print shop. The workflow management system includes a processor and a processor-readable storage medium that contains programming instructions that, when executed, determine the resources used to process each print job and the sequence in which the resources are used to process each print job. The workflow management system may then direct the resources in the print shop to process the print jobs according to the determined sequence. Each print job may have a corresponding set of operations to be performed. In an embodiment, the print jobs may be held in a queue until print jobs of a first type having a total print volume exceeding a threshold have been received.

The workflow management system may determine 310 a cost per item for processing the plurality of print jobs based on economic data that is associated with the print jobs. In an embodiment, the economic data includes data pertaining to the cost of producing an item when processing a print job, such as the cost of producing one business card, book, magazine, credit card statement or the like. In an alternate embodiment, the economic data includes data pertaining to the cost of performing one or more operations when processing a print job, such as the cost of printing one business card, the cost of performing one cutting operation, the cost of shrink wrapping the items for a print job or the like.

In an embodiment, the economic data may be generated based on simulating the processing of the received print jobs using the workflow management system. For example, processing the print jobs may be simulated a plurality of times in order to determine a sequence in which the processing is performed. The economic data may he generated from these simulations by determining the total cost of performing the operations required to process each print job. The cost per item may then be determined 310 by dividing the total cost by the number of items produced across all print jobs that are processed.

Each print job may have an associated print job type. For example, a print job type may include a soft-bound book, a business card, a magazine or the like. In an embodiment, the print job type may be determined at a more granular level. For example, the print job type may be based on the sequence of operations performed to process the print job.

A determination may then be made 315 as to whether the cost per item will be reduced by adding, removing or modifying one or more print jobs. If print jobs are added, the additional print jobs may have a print job type that is effective to reduce the cost per item. In an embodiment, the print job type for at least one additional print job may be the same as the print job type for the plurality of print jobs that are received 305. In an alternate embodiment, the print job type for at least one additional print job may differ from the print job type for the plurality of print jobs.

In an embodiment, the determination as to whether the cost per item will be reduced may be made 315 by determining an item count for the plurality of print jobs equal to the total number of items produced by processing the plurality of print jobs. A threshold item count may then be determined at which the cost per item is locally minimized. The item count may then be compared to the threshold item count. If the item count is less than the threshold item count, the cost per item may be reduced by processing one or more additional print jobs that increase the total item count towards the threshold item count. For example, if the item count for a plurality of print jobs is 4000 items and a reduction in the cost per item is achieved at 5000 items (i.e., the threshold item count), receiving and processing additional print jobs may reduce the cost per item. In particular, one or more additional print jobs that produce 1000 items may reduce the cost per item to the local minimum cost per item. Alternatively if the item count for a plurality of print jobs is 6000 and a reduction in the cost per item is achieved at 5000 items, requesting that one or more print jobs be processed with a reduced item count may reduce the cost per item.

In an alternate embodiment, the determination as to whether the cost per item will be reduced may be made 315 by determining an operation item count for an operation performed when processing the plurality of print jobs, determining an operation item threshold at which the cost per item for performing the operation is locally minimized, and determining whether the operation item count is less than the operation item threshold. The operation item count is the total number of items produced by performing the operation. For example, if 200 sheets are printed for print jobs under consideration, the operation item count for the printing operation may be 200 items. The operation item threshold may represent a number of items that are produced at a local minimum cost per item for performing an operation. For example, if a cutter can produce up to 500 items from a single cutting operation, and a cutting operation costs the same regardless of the number of sheets being cut, a local minimum cost per item for the cutting operation occurs for every 500 items produced. As such, potential operation item thresholds may be multiples of 500 items.

Referring back to FIG. 3, if the cost per item would not be reduced by adding, removing or modifying one or more print jobs, the plurality of print jobs may be processed 330. Otherwise, an offer to add, remove or modify a print job may be communicated 320. The offer may be communicated 320 directly to one or more customers or indirectly via a sale notice. For example, communicating 320 an offer may include displaying an offer on a website. In an embodiment, communicating 320 an offer may include accessing a storage medium to determine a customer that had previously requested a print job having an appropriate print job type and providing the offer to the customer.

In an alternate embodiment, communicating 320 an offer may include automatically transmitting the offer to a customer. For example, the offer may be transmitted via an email, a text message, a telephone call, a fax message and/or any other audio, video or electronic transmission.

In an embodiment in which the print job type of a print job solicited in the communicated offer is substantially similar to the print job type of the plurality of print jobs, communicating 320 an offer may include accessing a customer account for a customer that provided at least one of the plurality of print jobs and automatically increasing or reducing a print volume (i.e., a number of sheets produced) for a print job provided by the customer. When providing the print job to the print shop, the customer may include a designation that additional items may be produced for the print job at a certain cost per item. For example, the customer may accept 5000 items for a print job at a standard cost per item, but would accept 10000 items for the print job if the cost per item were reduced. Other methods of designating a customer's desire for additional items will be apparent to those of ordinary skill in the art. The workflow management system may inform the customer that the print volume for the print job has been increased or reduced by communicating with the customer via a messaging protocol, such as email, text messaging, telephone or the like. In an embodiment, the messaging protocol may be specified by either the customer or the print shop.

Referring back to FIG. 3, a response to the offer may be received 325 by the workflow management system. If the response rejects the offer, the workflow management system may determine 315 whether an alternate offer will be able to reduce the cost per item. If so, the alternate offer may be communicated 320. If the response accepts an offer to add a print job, a print job may be received. If the response accepts an offer to remove a print job, the print job may be removed from processing. If the response accepts an offer to modify a print job, the print job may be modified in accordance with the offer. The print shop may then process 330 the plurality of print jobs including the additional print job received as a result of the offer.

Figure 4:
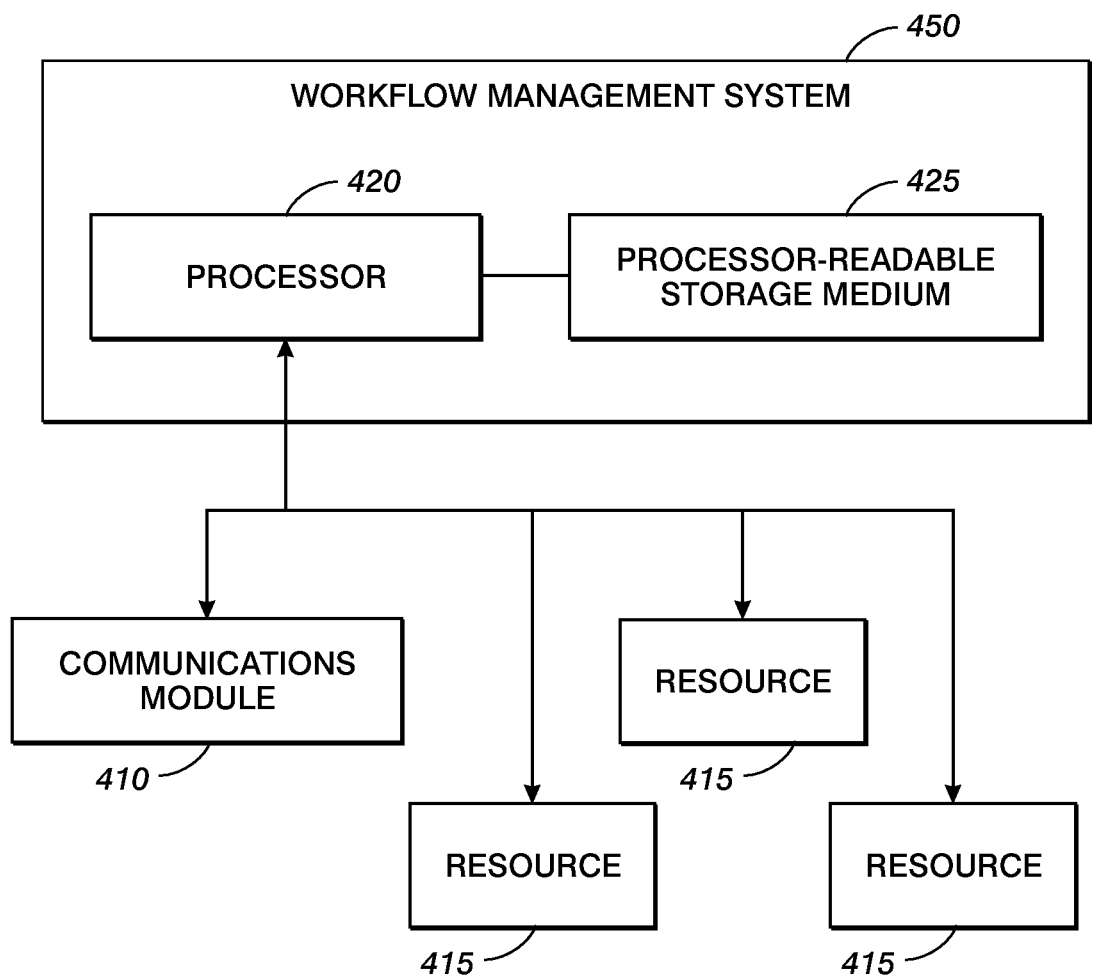
FIG. 4 depicts a block diagram of an exemplary system for increasing the efficiency of a print shop according to an embodiment.

FIG. 4 depicts a block diagram of an exemplary system for increasing the efficiency of a print shop according to an embodiment. As shown in FIG. 4, the system may include a workflow management system 450, a communications module 410 and a plurality of resources 415.

In an embodiment, the workflow management system 450 is computer-implemented in that it includes a processor 420 and a processor-readable storage medium 425 that contains programming instructions that, when executed, perform various functions, such as the functions described above. For example, the workflow management system 450 may be used to receive print jobs, determine a cost per item for processing the print jobs based on economic data associated with the plurality of print jobs, and determine whether additional print jobs may reduce the cost per item of processing the print jobs. The workflow management system 450 may additionally receive a response to an offer to process an additional print job, receive an additional print job, and direct the plurality of resources to process the received print jobs.

The communications module 410 may be used to communicate an offer to process an additional print job. The communications module 410 may display information on a website, directly contact a customer or third party, such as via email, telephone, text messaging, fax or the like, and/or by accessing a database of print jobs to process and increasing a print volume for a print job based on a designation provided by the customer submitting the print job.

The plurality of resources 415 maybe used to process the plurality of print jobs. The plurality of resources 415 may include printers, collators, cutters, binders, inserters, shrink wrapping devices, postage meters, and the like. In an embodiment, one or more of the resources 415 may perform multiple functions. The plurality of resources 415 may process the plurality of print jobs, for example, when directed to do so by the workflow management system.

It will be appreciated that various of the above-disclosed and other features and functions, or alternatives thereof may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for improving resource usage in a print shop, the system comprising:
    a plurality of resources in a print shop, wherein the resources comprise one or more of the following: a printer, a collator, a cutter, a binder, an inserter, a shrink wrapping device of a postage meter; and
    a workflow management system comprising a processor and a processor-readable storage medium in communication with the processor, wherein the processor readable storage medium comprises one or more programming instructions that, when executed, cause the processor to:
    receive a plurality of first type print jobs for processing at the print shop,
    determine a cost per item for processing the plurality of first type print jobs based on economic data associated with the plurality of first type print jobs,
    determine whether the cost per item will be reduced by adding a second type print job to the plurality of first type print jobs or removing a first type print job from the plurality of first type print jobs, and
    determine a set of the resources to be used to process each remaining first type print job and a sequence in which the determined resources will be used to process each remaining first type print job, and
    direct the determined resources in the print shop to process each remaining first type print job.

2. The system of claim 1, further comprising:
    a website configured to display an offer.

3. The system of claim 1, further comprising:
    a communication module configured to:
        access a database to determine a customer that had previously requested a second type print job, and
        communicate an offer to perform the second type print job to the customer.

4. The system of claim 1, further comprising:
    a communication module configured to automatically transmit an offer to perform a second type print job to a customer.

5. The system of claim 1, further comprising:
    a communication module configured to:
        access a customer account for a customer that provided at least one of the plurality of first type print jobs; and
        automatically increase an item count for a first type print job provided by the customer.

6. The system of claim 1 wherein the processor-readable storage medium further comprises one or more programming instructions that, when executed, cause the processor to store the plurality of first type print jobs until an item count for the first type print jobs exceeds a threshold, wherein the item count comprises a total number of items processed by processing the first type print jobs.

7. The system of claim 1 wherein the processor-readable storage medium further comprises one or more programming instructions that, when executed, cause the processor to receive a second type print job, and wherein the plurality of resources are further configured to process the second type print job.

8. The system of claim 1 wherein the one or more programming instructions to determine whether the cost per item will be reduced comprise one or more programming instructions that, when executed, cause the processor to:
    determine an item count for the first type print jobs, wherein the item count comprises a total number of items processed by processing the first type print jobs;
    determine a item threshold at which the cost per item is locally minimized; and
    determine a difference between the item count and the item threshold.

9. The system of claim 1 wherein the one or more programming instructions to determine whether the cost per item will be reduced comprise one or more programming instructions that, when executed, cause the processor to, for an operation performed when processing the first type print jobs:
    determine an operation item count for the operation, wherein the operation item count comprises a total number of items processed by performing the operation;
    determine an operation item threshold at which the cost per item for performing the operation is locally minimized; and
    determine a difference between the operation item count and the operation item threshold.

10. The system of claim 1 wherein the plurality of resources comprise:
    a first set of resources substantially utilized to process the first type print jobs; and
    a second set of resources utilized more to process the second type print jobs than the first type print jobs,
    wherein the second set of resources is mutually exclusive from the first set of resources.

11. A computer-implemented method of improving resource usage in a print shop, comprising:
    receiving a set of one or more first type print jobs;
    determining, by a processor in a workflow management system, (1) a cost per item associated with processing the first type print jobs based on economic data associated with the first type print jobs, and (2) whether the cost per item will be reduced by performing one or more of: adding a second type print job to the set of one or more first type print jobs, and removing a first type print job from the set of one or more first type print jobs;
    altering, by the processor, the set of one or more first type print jobs when it is determined that the cost per item will be reduced by performing one or more of: adding a second type print job to the set of one or more first type print jobs, and removing a first type print job from the set of one or more first type print jobs; and,
    processing, by the processor, the altered set of one or more first type print jobs with one or more resources, wherein the one or more resources comprise a printer, collator, cutter, binder, inserter, shrink wrapping device, or postage meter.

12. The method of claim 11, further comprising:
designating one or more resources for processing at least one first type print job.

13. The method of claim 11, further comprising:
displaying an offer to perform a second type print job on a website.

14. The method of claim 11, further comprising:
accessing a database to determine a customer that had previously requested a second type print job; and
communicating an offer to perform the second type print job to the customer.

15. The method of claim 11, further comprising:
automatically transmitting an offer to perform a second type print job to a customer.

16. The method of claim 11, further comprising:
accessing a customer account for a customer that provided a first type print job; and
automatically increasing an item count for a first type print job provided by the customer.

17. The method of claim 1, further comprising:
storing the set of first type print jobs until an item count for the first type print jobs exceeds a threshold,
wherein the item count comprises a total number of items processed by processing the first type print jobs.

18. The method of claim 11, further comprising:
receiving a second type print job; and
processing the second type print job.

19. The method of claim 11 wherein determining whether the cost per item will be reduced comprises:
determining an item count for the set of first type print jobs, wherein the item count comprises a total number of items processed by processing the set of first type print jobs;
determining an item threshold at which the cost per item is locally minimized; and
determining a difference between the item count and the item threshold.

20. The method of claim 11 wherein determining whether the cost per item will be reduced comprises, for an operation performed when processing the set of first type print jobs:
determining an operation item count for the operation, wherein the operation item count comprises a total number of items processed by performing the operation;
determining an operation item threshold at which the cost per item for performing the operation is locally minimized; and
determining a difference between the operation item count and the operation item threshold.

21. A system for improving resource usage in a print shop, the system comprising:
a plurality of resources in the print shop, wherein the resources are capable of processing at least first type print jobs and comprise a printer, collator, cutter, binder, inserter, shrink wrapping device or postage meter;
a workflow management system comprising a processor in communication with the plurality of resources; and
a processor-readable storage medium in communication with the processor,
wherein the processor-readable storage medium contains one or more programming instructions for performing a method of improving resource usage in a print shop, the method comprising:
receiving a set of one or more first type print jobs,
determining a cost per item associated with processing the first type print jobs based on economic data associated with the first type print jobs,
determining whether the cost per item will be reduced by performing one or more of: adding a second type print job to the set of one or more first type print jobs, and removing a first type print job from the set of one or more first type print jobs,
altering the set of one or more first type print jobs when it is determined that the cost per item will be reduced by performing one or more of: adding a second type print job to the set of one or more first type print jobs, and removing a first type print job from the set of one or more first type print jobs, and
directing the resources to process the altered set of one or more first type print jobs.

* * * * *